United States Patent [19]

Hannover

[11] Patent Number: 4,781,780
[45] Date of Patent: Nov. 1, 1988

[54] METHOD OF PRODUCING A THERMOPLASTIC POLYMER-LINED PIPE

[75] Inventor: Finn Hannover, Wilmington, Del.

[73] Assignee: Du Pont (U.K.) Limited, Wedgwood Way, United Kingdom

[21] Appl. No.: 34,038

[22] Filed: Apr. 3, 1987

[30] Foreign Application Priority Data

Apr. 11, 1986 [GB] United Kingdom ............... 8608805

[51] Int. Cl.⁴ ............................................ B29C 17/00
[52] U.S. Cl. ....................................... 156/287; 156/294; 156/304.2; 264/230
[58] Field of Search ............... 156/294, 272.2, 287, 156/304.2, 391, 423, 499, 574; 425/460; 264/230, 289.6; 118/306, 215; 427/230; 34/104, 4, 107; 219/66, 279, 354, 377; 250/494.1, 495.1

[56] References Cited

U.S. PATENT DOCUMENTS

| | | |
|---|---|---|
| 2,343,225 | 2/1944 | Pray et al. ............................ 156/294 |
| 2,516,242 | 7/1950 | Munger ............................... 156/391 |
| 2,745,778 | 5/1956 | Garten ................................ 156/294 |
| 3,037,228 | 6/1962 | Cummings ......................... 118/306 |
| 3,106,735 | 10/1963 | Landrum et al. .................. 118/306 |
| 4,132,958 | 1/1979 | Wood ................................. 156/574 |
| 4,352,708 | 10/1982 | McElory ........................... 156/304.2 |
| 4,410,391 | 10/1983 | Thomas et al. .................... 264/230 |
| 4,600,749 | 7/1986 | Minekawa et al. ................ 525/314 |

FOREIGN PATENT DOCUMENTS

| | | | |
|---|---|---|---|
| 1084224 | 8/1980 | Canada ............................... 156/294 |
| 150482 | 11/1979 | Japan ................................. 156/294 |
| 6740 | 1/1982 | Japan ................................. 156/294 |
| 115431 | 6/1985 | Japan ................................. 156/294 |

*Primary Examiner*—Michael Ball
*Attorney, Agent, or Firm*—Donald W. Huntley

[57] ABSTRACT

Process for lining a pipe with thermoplastic polymer using non-crosslinked, expandable thermoplastic liner which is uniformly heated after insertion into the pipe.

8 Claims, 3 Drawing Sheets

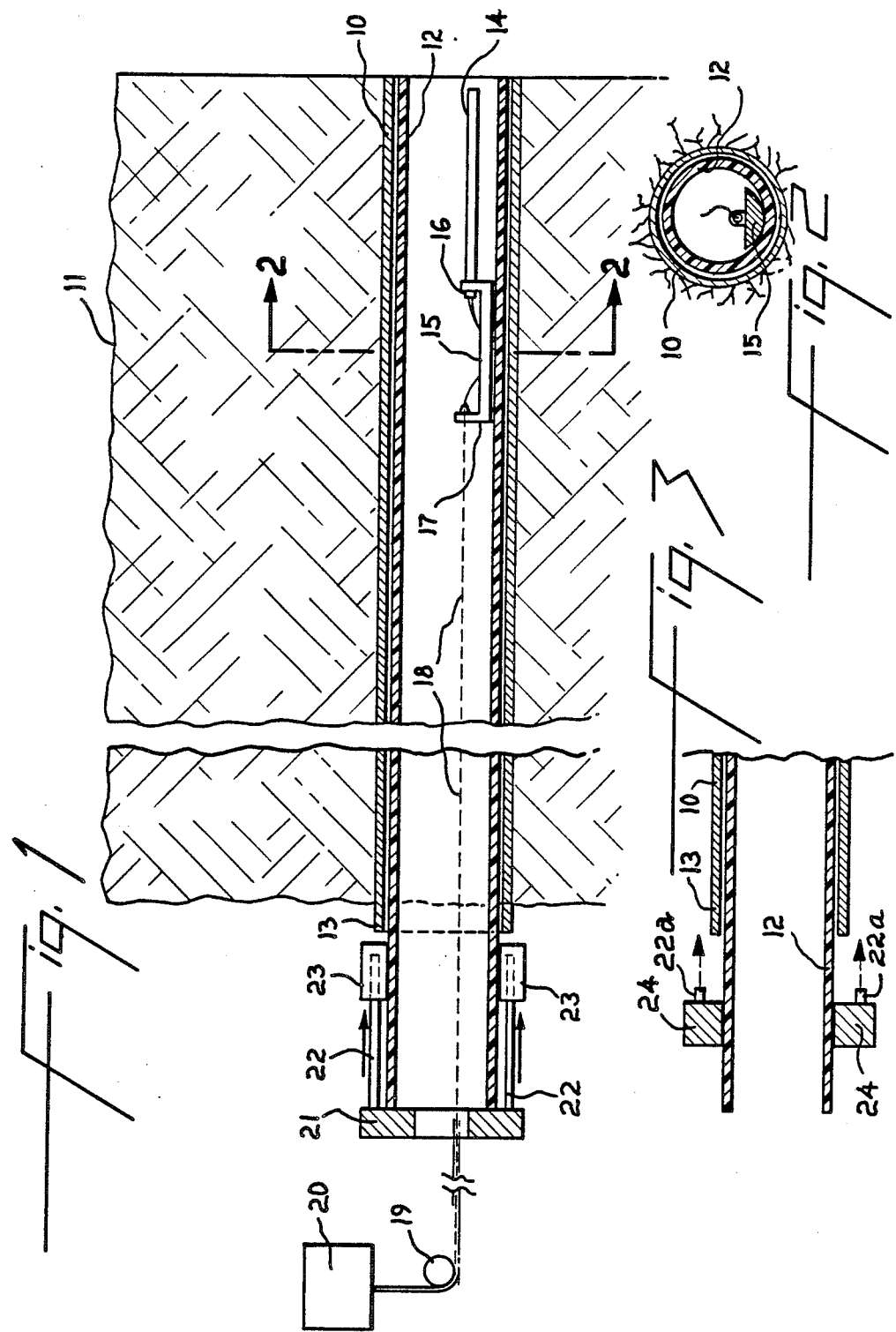

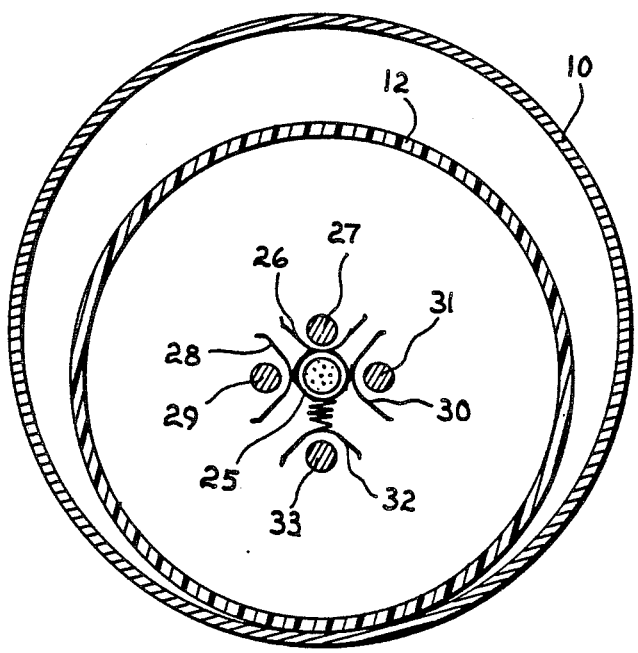

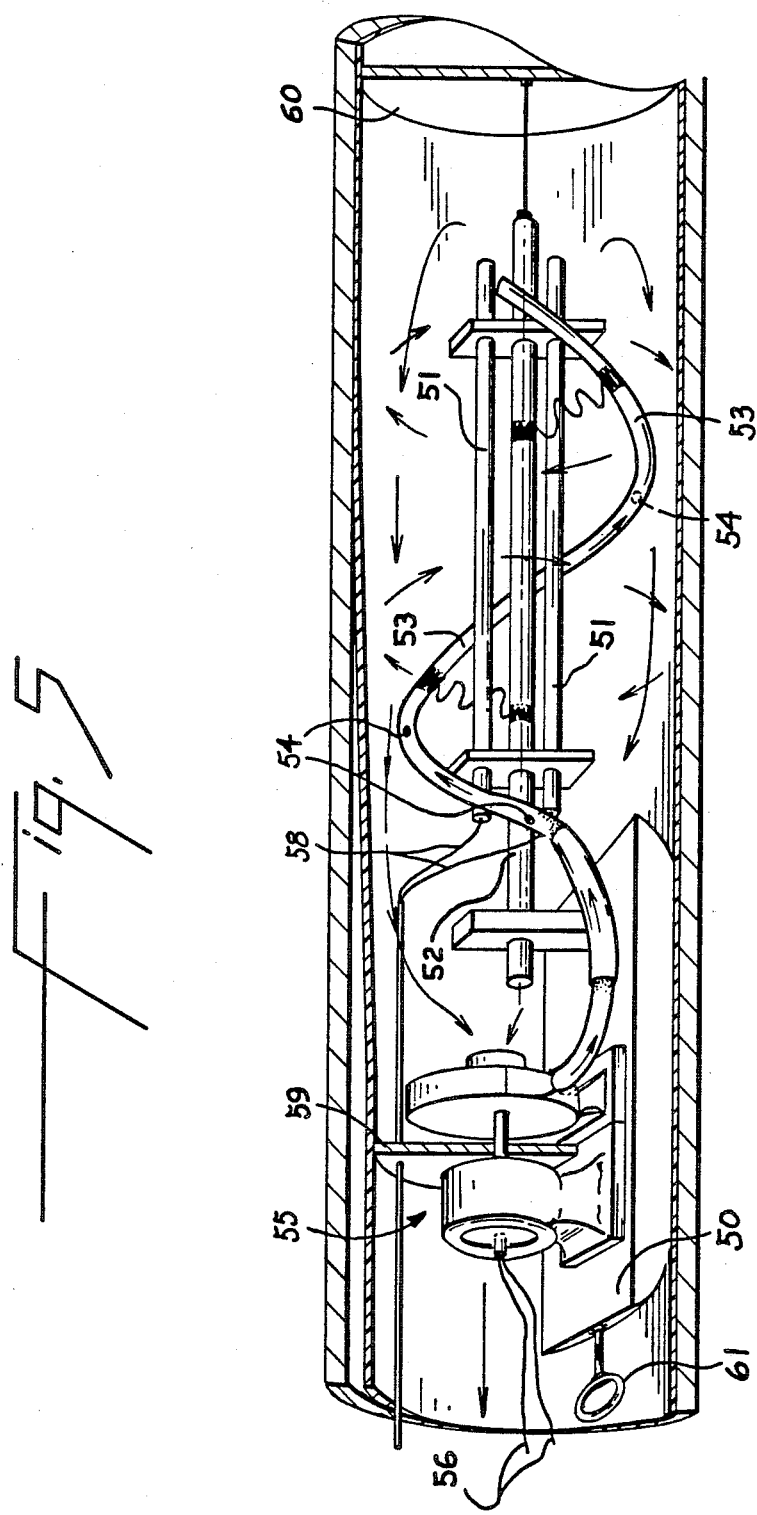

METHOD OF PRODUCING A THERMOPLASTIC POLYMER-LINED PIPE

BACKGROUND OF THE INVENTION

This invention relates to a method for lining tubular structures such as pipe, particularly, but not exclusively, long lengths of pipe in situ such as underground gas or water and sewer mains.

Metal pipes may be lined with thermoplastic polymers to convey corrosive material such as acids, or the lining may be used simply to rehabilitate or prolong the life of old, existing water or gas supply pipes or other pipes which may carry relatively non-corrosive fluids.

It has been proposed in U.S. Pat. No. 3,429,954 to line metal pipe by inserting into a pipe a longitudinally oriented heat shrinkable, irradiated thermoplastic polymer tubing, the tubing having in its unoriented state an outer diameter greater than the internal diameter of the metal pipe but slightly smaller than the internal diameter when oriented, and heating the tubing to a temperature above the crystalline melting point of the polymer to longitudinally shrink the polymer tubing and cause it to expand radially and fit tightly against the internal wall of the pipe.

The polymer tubings employed in U.S. Pat. No. 3,429,954 were irradiated to cross-link the polymer. This technique may be satisfactory for small diameter pipe, which is normally obtained and installed from a large coil. However, polymeric pipe having a diameter of greater than 3 or 4 inches is generally available only in straight lengths of several feet each, which must be joined by butt fusion or butt solvent welding techniques. Cross-linked polymers cannot with confidence be joined by fusion or solvent welding and are inferior in this respect to non-crosslinked thermoplastic polymers.

In the U.S. patent it is also suggested that the same polymer liners be expanded by heating using one of three methods.
(a) application of hot air internally
(b) passing the polymer lined pipe through a furnace so as to apply heat externally
(c) immersing the polymer lined pipe in a propylene glycol bath.

While methods (b) and (c) for obvious reasons are impractical for the relining of long, continuous lengths of underground pipe, method (a) is not effective either because in long pipe sections the air or any other gas or fluid will cool rapidly as it progresses along the pipe and there will be insufficient heat to raise the entire length of the polymer liners to the necessary temperatures.

A further problem in the lining of long lengths of metal pipe is that to achieve the proper expansion of the polymer liners inside the metal pipe, the liner must be completely free to shrink in the longitudinal direction. If the shrinkage is prevented or only slightly hindered in any way, it will result in no or only a reduced and insufficient expansion, as well as undesirable axial tensile stresses in the pipe that may be harmful to the fused or solvent welded joint.

In particular, where long, continuous lengths of pipe are to be lined, problems arise where the weight and associated friction drag of the long lengths of the lining itself, inside the metal pipe tends to prevent the required shrinkage. This situation may be further aggravated where the metal pipe is not completely straight and the liner becomes pinched or where the polymer liner during the expansion process itself expands unevenly or at a different rate either at various points along the length of the liner where it may tend to hang up, or around the periphery of the liner where this may cause the liner to curve in the length direction inside the metal pipe and thereby become pinched.

It is the object of this invention to provide a method particularly for lining long lengths of underground pipe that will overcome all of the above mentioned difficulties and problems.

SUMMARY OF THE INVENTION

The present invention provides a process for lining a pipe with a thermoplastic polymer which comprises:
(a) selecting a substantially non-crosslinked, expandable, thermoplastic tubular polymer liner having an outside diameter less than the internal diameter of the pipe and which, when fully expanded, would have an outside diameter greater than the internal diameter of the pipe;
(b) inserting the tubular polymer liner into the pipe; and
(c) heating the polymer liner sequentially from one point toward at least one free end of the pipe and uniformly about its circumference to a temperature sufficient to cause the liner to expand while applying positive axial pressure on the end of the liner toward which the liner is being heated.

BRIEF DESCRIPTION OF THE DRAWINGS

FIG. 1 illustrates in diagrammatic sectional from practice of the method of this invention in lining an underground pipe;

FIG. 2 is a sectional view of FIG. 1 taken on line 2—2;

FIG. 3 is an illustration of a portion of FIG. 1 modified to show a different method of applying axial pressure to the thermoplastic liner;

FIG. 4 is a section through a pipe and liner showing a modified radiant heater; and FIG. 5 is a partly cut away side view of a preferred heater which can be used in the instant invention.

DETAILED DESCRIPTION OF THE INVENTION

Thermoplastic polymers which can be used in the practice of this invention include any non-crosslinked, thermoplastic homopolymers and copolymers which are capable of maintaining a deformation brought about from being heated, stretched and cooled, and which return to their approximate original dimension up reheating.

Specific examples include homopolymers such as polyethylene, polypropylene, polybutene; copolymers of ethylene and vinyl esters of aliphatic carboxylic acids such as vinyl acetate and vinyl propionate; copolymers of ethylene and alkyl acrylate and methyl methacrylate; copolymers of ethylene and other alpha-olefins such as propylene, butene, hexene and octene; copolymers of ethylene and ethylenically unsaturated carboxylic acids such as acrylic acid, methacrylic acid and the like. Still other classes of thermoplastic materials which can be used include polyacetals, polyvinyl chloride and chlorinated polyvinyl chloride, polyamides and acrylics such as polymethyl methacrylate.

Preferred thermoplastic materials which can be used in the invention include polyethylene such as that manufactured by Du Pont under the Trade Mark ALATHON, ethylene-octene and ethylene-hexene copolymers.

In a preferred method of preparing the liners used in the present invention, the polymer liner is first heated to a temperature within the normal annealing temperature range of the polymer, and preferably to a temperature which is about from 10 to 30 Centigrade degrees below the melting point of the polymer. The liner is then stretched to reduce the outer diameter sufficiently so that upon cooling to room temperature and removal of the tension, the dimensionally stable outside diameter is less than the internal diameter of the pipe to be lined.

A polyethylene liner capable of expanding about from 8 to 15% of its diameter, for example, can be made from a tubular polyethylene billet with an outside diameter slightly larger than that of the internal diameter of the pipe by:

(a) heating the billet to a temperature in the range 105° to 120° C. or about 10° to 20° C. below its crystalline melting point (b) stretching the tubular billet at this temperature in the range 1.3× to 1.7× its original length (c) cooling the stretched tube under tension to room temperature (d) relieving the tension and permitting the tube to relax for a period of time (usually 2 to 3 days) until the dimension remains stable.

Preferably the outside diameter of the unexpanded liner is 5 to 12% smaller than the nominal inside diameter of the tubular structure so that one liner size may accommodate a narrow range of different pipe inside diameters.

It is normally necessary to join a series of pieces of liner together to produce a sufficient continuous length.

In the process of butt welding it is normal to clamp two pieces of pipe adjacent to each other, face off their adjacent end surfaces, apply heat to these end surfaces to affect some melting and then bring the two face surfaces or ends of the pipes together so as to butt weld the two portions together. If this is done with pipe which has been stretched such as the liners used in the present invention, the heat will cause circumferential expansion of the pipe or liner at the joint which will create an undesirable bulge at the joint. To avoid this, during the butt welding the two ends of liner or pipe must be clamped as near as possible to the junction and the diameters at this point must be slightly compressed or reduced to counteract the tendency of the pipe to expand as it is heated. By maintaining the clamp compression close to and on each side of the joint during the welding and until the joint has cooled to room temperature, it is possible to make a butt fusion without any diameter distortions or bulges.

A preferred method of joining successive sections of the heat expandable liner by butt heat fusion involves (a) circumferentially compressing the end of each stretched liner section to be joined about from 1 to 5% by clamping each such end with a circumferential clamp;

(b) positioning the clamps or stops on the equipment to permit the faced off ends of each liner section to protrude from the edge of each clamp about from 0.5 to 1.5 times the thickness of the liner;

(c) heating the ends of the liner sections to be joined to the fusion temperature of the thermoplastic from which the liner is made; and (d) bringing the ends of the heated liner section into contact under pressure and maintaining the contact until the temperature of the ends falls to substantially ambient temperature.

Typically the interfacial pressure applied during the fusion of the ends of the liner sections is about from 40 to 60 psi.

After joining successive sections, the beads on the inside and outside of the pipe are typically cleaned by conventional means. Internal cleaning is described, for example, in Brandt, U.S. Pat. No. 3,805,311, hereby incorporated by reference.

Thus by successively joining sections it is possible to insert into the metal pipe a total length of heat expandable liner which should typically be about from 10 to 35% longer than the metal pipe to allow for longitudinal shrinkage which will vary depending on the required expansion.

To expand the liner it is preferably heated from the inside of the liner with a radiant infra-red heater. The polymer liner should be heated uniformly about its circumference and sequentially from one point toward at least one free end of the pipe. Accordingly, the radiant heater may be inserted into the liner, either to an intermediate point or at the end of the pipe, and moved through the pipe towards an open end from said intermediate point or from said one end at a rate such as to relieve the internal strain applied by the stretching and to allow for full expansion of the polymer liner into contact with the internal surface of the pipe. The method of moving the heating zone from an intermediate point or from one end is to ensure that the longitudinal shrinkage which is associated with radial expansion can take place unhindered.

To obtain the best expansion and fit with the internal diameter of the pipe to be lined and to protect the fused or welded joints, an axial compressive force is preferably applied at the free end of the polymer pipe toward which the heater is moving so as to overcome frictional drag forces from the weight of the not yet expanded section of the liner, to overcome the resistance forces from pinch points along the pipe and in this way assist in the movement of the unexpanded liner section to accomplish the required axial shrinkage. Preferably this axial force should produce some axial compression in the zone of the expansion during the entire operation. Preferably, the axial pressure applied is equal to about from 100 to 400 psi of the cross-sectional area of the pipe wall.

The radiant heater may, for example, be in the form of a rod or bar supported at one end on a carriage which is shaped to conform to the shape of the liner and is slid along the liner. A preferred heater which can be used in the present invention, having anterior and posterior ends, comprises:

(a) a platform;

(b) at least one radiant heating element mounted on the platform;

(c) a spiral air tube mounted on the platform to encircle the heating element at least once in a direction axial to the liner, the air tube having a plurality of apertures formed therein positioned to create a circumferential air flow within the pipe;

(d) electrical and pressurized air sources functionally connected to the radiant heating element and air tube, respectively;

(e) means for moving the platform through the pipe; and (f) a diametric gasket positioned anterior to the heating element to separate the apparatus from the portion of the pipe anterior to the heating element.

In the installation of pipe liner according to the present invention, the liner may not conform in minute detail to the inside of the pipe which may be rough, uneven or pitted. Further, if good conformation of the pipe liner and the pipe wall is initially obtained, temperature variations in the pipeline can cause a gap between the liner and the pipe wall. In the event that a leak in the system should develop, detection and repair of the leak would be difficult.

Accordingly, in another preferred embodiment of the invention, the pipe liner has a coating of about from 10 to 100 mils on the outer surface thereof of a thermoplastic elastomer hot melt adhesive, the thermoplastic elastomer having a flexural modulus of about from 500 to 10,000 psi and a melting point of about from 40° to 120° C. Preferably, the polymer has a melting point of about from 50° to 100° C., and melting points of about from 65° to 85° C. are especially preferred.

As the heater is moved through the liner, the outside surface of the liner reaches temperatures that will melt or soften the thermoplastic elastomeric melt adhesive. As the liner simultaneously expands and presses against the internal surface of the pipe, a good bond between the pipe and the liner is assured.

Thermoplastic elastomers which can be used in a coating for the pipe liner include, for example, ethylene vinyl esters, ethylene acrylate copolymers, ethylene olefinic copolymers such as ethylene propylene rubbers, styrene isoprene, styrene butadiene or styrene ethylene propylene block copolymers. These materials can be functionalized with a comonomer which gives good adhesion to metals, such as maleic anhydride, the half-ester of maleic anhydride, acids such as methacrylic acid, acrylic acid or itaconic acid or epoxy functionalized or saturated monomers such as glycidyl methacrylate or acrylate. By controlling the comonomer content and selecting the proper comonomer, these materials can adhere well to the polymer of the pipe liner by direct copolymerization or by a grafting reaction.

The coating of thermoplastic elastomers can be applied to the surface of the pipe line either continuously or intermittently. The coating can be applied by conventional coating means or in the form of a tape that is wrapped around the pipe and subsequently heat fused to provide an integral coating.

The invention may be more fully understood by reference to the Figures.

In FIG. 1 is shown an iron gas main 10 which is located underground and may be several feet below ground level 11.

The gas main is to be lined with a polyethylene pipe liner 12.

The length of prestressed polymeric pipe liner 12 is chosen to be of larger length than the pipe 10. The outer diameter of the polymeric liner is not more than 10% less than the internal diameter of the pipe 10.

One end 13 of the iron pipe is exposed by excavating a cavity in the ground, the cavity being sufficiently large to feed through a long length of polyethylene pipe liner which may, for example, be about 10 to 12 meters in length.

The polymeric pipe liner is then inserted into the pipe 10 leaving a portion of the length of the polymeric pipe liner exposed so as to allow for axial shrinkage of the liner during the subsequent radial expansion within the pipe.

A radiant heater 14 which is preferably in the form of an elongated tube is then inserted into the liner on a carriage 15. The carriage 15 is shaped to conform to the shape of the liner so that it will slide freely along the liner and has a post 16 at one end of which the heater 14 is cantilevered.

At the other end is a second post 17 to which is attached a rope or cable 18 which may incorporate the wires carrying the power supply to the heater 14. Alternatively separate wires may be provided to the heater 14.

The rope or cable 18 passes around the pulley 19 and to a motor 20 which can provide a steady gentle pull on the rope 18 so as to pull the carriage or sledge 15 at a predetermined steady rate through the pipe. The motor 20 is preferably variable in speed so as to adjust the speed at which the carriage 15 moves through the pipe.

It has been found in practice that it is desirable to position the radiant heater 14 so that it is below the mid-level of the liner to ensure that the portion of the liner at the lowermost part of the pipe receives sufficient heat.

Since the liner is most likely resting on the bottom of the metal pipe this is where the more important heat sink is. For this reason this area should receive the highest heat intensity from the infrared heater. Since the top of the liner is not initially in contact with the steel pipe—and therefore, has no heat sink—and at the same time is favored as far as convective heat transfer is concerned, this area should receive the lowest heat intensity from the radiant heater. This is achievable with the type of improved heating arrangement shown in FIG. 4.

A central support tube 25 carries the electric wiring supplying four radiant rod heaters 27, 29, 31, 33 of the infrared type, each being provided with a reflector 26, 28, 30, 32 respectively. The reflector 32 and heater rod 33 are located much further from the center line of the pipe than the other heaters are.

The infra-red heaters preferably operate in the range 2 to 3 u., i.e., in the medium range of infrared spectrum. Preferably, the stretched liner is heated in the presence of an inert gas.

An incentive for using infrared heating is that polyethylene over a large range of wave lengths is somewhat transparent to infra-red radiation. This means that a significant proportion of the infra-red energy penetrates into the polyethylene liner wall directly causing it to heat up faster than if it was heated up by other means which depend solely on conduction through the pipe wall.

The heater 14 is then pulled gently through the pipe and liner so as to cause the liner to expand and attempt to return to its original diameter thus making an effective tight seal against the inner circumference of the pipe 10.

Because of drag and weight of the liner when such long lengths of liner are employed, the expansion may not occur uniformly and fully. To overcome this problem an axial thrust or force is preferably applied to the liner 12, for example, by means of a block or bar 21 connected by rods 22 to jack devices 23 which may be set to provide a steady pull on the block 21 so as to overcome any drag or inertia of the liner as it proceeds into the pipe.

The jacks may be automatic devices which provide a constant pull or they may be operated manually and the force applied may be adjusted to suit particular lengths of liner and weights of liner and drag situation.

In FIG. 3 an alternative method is shown of applying the axial force to the liner. A clamp 24 is used which again may be attached via rods 22a to suitable jacks similar to 23. By attaching the clamp 24 at a point fairly close to the entrance 13 of the pipe 10 a better control can be achieved on the axial force applied without distorting the liner.

A preferred heater for use in the present invention is shown in FIG. 5. In that Figure, platform 50 has two radiant heating elements 51 mounted ontthe platform through support means 52. Spiral air tube 53 is similarly mounted on the platform to encircle the heating element. Apertures 54 are formed in the air tubes in such positions as to create a circumferential air flow within the pipe liner. Blower 55 provides a pressurized air source connected to the air tube. The blower is powered by a motor 56. The motor and radiant heating elements are respectively connected to electrical sources 57 and 58. Diametric gasket 59 is positioned anterior to the heating element to separate the apparatus from the portion of the pipe preceding the heater. Optional posterior diametric gasket 60 similarly isolates the portion of the pipe behind the heating apparatus. The heating apparatus can be either drawn or pushed through the pipe liner by attaching means 61.

It has been found to be particularly convenient to mount the air tube and the heating element on a common suspension, as shown in the Figure. While a single radiant heater can be used, particularly with smaller sized pipe, it is preferred to position two or more heaters, as shown, substantially equidistant from the center of the pipe.

The present invention provides a method for lining pipe that not only effectively seals decayed pipe, but can be efficiently operated by a relatively small work force. Example An iron gas pipe 10 which had lain in the ground for 50 years was to be lined with a polythene liner so as to extend the life of the original pipe. It was important to retain the volume flow through the pipe and so the liner was selected to cause the minimum reduction cross-sectional area of the original pipe and had to be brought into firm contact with internal surface of the pipe 10.

The pipe 10 was a 20 ft (6 m) 8 inch nominal diameter cast iron main with an average inside diameter of 8.4 inches (21.4 cm).

A polyethylene liner was selected with an outside diameter of 8.95 inches (22.7 cm) and a wall thickness of 0.29 inches (0.75 cm) produced from an ethylene octene-1 copolymer having a melt index of 1 and a density of 0.937 g/cc containing antioxidants and pigment.

The polyethylene liner was heated to a temperature of 113° C. over a period of 1 hour and subsequently stretched 1.5×. After the liner had cooled to room temperature in this state the tension was released and the liner was permitted to relax. After three days, no further dimensional changes were noticable and the outside diameter of the liner remained 7.65 inches (19.4 cm).

A 25 ft (7.72 cm) long section of this liner was inserted into the 20 ft (6 m) long cast iron pipe in such a way that the liner and pipe were flush at one end with the longer length liner extending 5 ft out of the other pipe end 13.

A heater, of the design shown in FIG. 5, using four 1 ft long, ⅜ inch diameter 1 kw cartridge heaters was slid into the liner so that the heater elements extended just outside the far end, with the carriage section supported inside the liner.

After the current was turned on and the heater cartridges had reached their maximum temperature, the motor was started and the heater carriage progressivly moved along the pipe from right to left as shown in FIG. 1. As soon as the end of the heater was about 6 inches inside the liner, the end of the liner was plugged and the air source was turned on. At the same time, axial pressure of 100 pounds per square inch of liner wall thickness was applied by means of the mechanism shown in FIG. 1. By moving the heater carriage at a rate of 4 to 5 inches/minute along the liner, the liner expanded to provide a good fit with the internal diameter of the cast iron pipe. The axial pressure ensured that full radial expansion took place. In the course of the radial expansion and axial contraction the portion of the liner extending outside of the pipe contracted into the pipe.

I claim:
1. A process for lining a pipe with a thermoplastic polymer which comprises:
   (a) selecting a substantially non-crosslinked, thermoplastic tubular polymer liner, the liner being heat shrinkable along its length and heat expandable in its diameter to provide a diametric expansion on heating about from 8 to 15%, the liner having an outside diameter less than the internal diameter of the pipe and which, when fully expanded, would have an outside diameter greater than the internal diameter of the pipe;
   (b) inserting the tubular polymer liner into the pipe; and
   (c) heating the polymer liner sequentially from one point toward at least one free end of the pipe and uniformly about its circumference to a temperature sufficient to cause the liner to expand while applying a compressive axial force sufficient to overcome the drag forces of the liner, the compressive axial force being applied to the end of the liner toward which the liner is being heated.
2. A process of claim 1 wherein the expandable polymer liner is prepared by
   (a) selecting a substantially non-crosslinked, thermoplastic tubular polymer liner of outside diameter greater than the internal diameter of the pipe;
   (b) heating the tubular polymer liner to within the normal annealing temperature range of the polymer and stretching the heated polymer liner until its outside diameter has been sufficiently reduced so that upon cooling to room temperature and subsequently relieving the tension the outside diameter of the liner is less than the internal diameter of the pipe.
3. A process of claim 1 wherein the axial pressure is equal to about from 100 to 400 pounds per square inch of the cross-sectional area of the pipe wall.
4. A process of claim 1 wherein the polymer liner is uniformly heated by passing therethrough an apparatus having anterior and posterior ends and comprising:
   (a) a platform;
   (b) at least one radiant heating element mounted on the platform;
   (c) a spiral air tube mounted on the platform to encircle the heating element at least once in a direction axial to the liner, the air tube having a plurality of apertures formed therein positioned to create a circumferential air flow within the pipe;

(d) electrical and pressurized air sources functionally connected to the radiant heating element and air tube, respectively;

(e) means for moving the platform through the pipe; and (f) a diametric gasket positioned anterior to the heating element to separate the apparatus from the portion of the pipe anterior to the heating element; while heating the element to a temperature of at least about 1200° F. and forcing gas through the air tube to provide a flow sufficient to distribute the heat substantially uniformly about the circumference of the liner.

5. A process of claim 4 wherein the apparatus is drawn through the pipe.

6. A process of claim 1 wherein successive sections of liner are joined by (a) circumferentially compressing the end of each stretched liner section to be joined about from 1 to 5% by clamping each such end with a circumferential clamp;

(b) positioning the clamps to permit the ends of each liner section to protrude from the edge of each clamp about from 0.5 to 1.5 times the thickness of the liner;

(c) heating the ends of the liner sections to be joined to the fusion temperature of the thermoplastic from which the liner is made; and (d) bringing the ends of the heated liner section into contact under pressure and maintaining the contact and pressure until the temperature of the ends falls to substantially ambient temperature.

7. A process of claim 1 wherein the stretched liner is heated in the presence of an inert gas.

8. A process of claim 1 wherein the pipe has a coating of about from 10 to 100 mils on the outer surface thereof of a thermoplastic elastomer, the thermoplastic elastomer having a flexural modulus of about from 500 to 10,000 psi, and a melt softening range of about from 40° to 120° C.

* * * * *